(12) United States Patent
Shimura et al.

(10) Patent No.: US 9,496,752 B2
(45) Date of Patent: Nov. 15, 2016

(54) HYBRID POWER SOURCE SYSTEM

(75) Inventors: Jusuke Shimura, Kanagawa (JP); Yoshiaki Inoue, Aichi (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 13/394,478

(22) PCT Filed: Sep. 9, 2010

(86) PCT No.: PCT/JP2010/065992
§ 371 (c)(1),
(2), (4) Date: May 15, 2012

(87) PCT Pub. No.: WO2011/034112
PCT Pub. Date: Mar. 24, 2011

(65) Prior Publication Data
US 2012/0219829 A1   Aug. 30, 2012

(30) Foreign Application Priority Data
Sep. 16, 2009   (JP) ................................ 2009-214071

(51) Int. Cl.
| | |
|---|---|
| H02J 7/35 | (2006.01) |
| H01M 14/00 | (2006.01) |
| H01M 16/00 | (2006.01) |
| H01L 31/042 | (2014.01) |
| H02S 40/38 | (2014.01) |

(52) U.S. Cl.
CPC .............. *H02J 7/35* (2013.01); *H01M 14/005* (2013.01); *H01M 16/00* (2013.01); *H01M 16/006* (2013.01); *H02S 40/00* (2013.01); *H02S 40/38* (2014.12); *Y02E 10/542* (2013.01); *Y02E 10/566* (2013.01); *Y02E 60/122* (2013.01); *Y02E 60/523* (2013.01)

(58) Field of Classification Search
CPC .. H01M 2/34; H01M 8/04589; H01M 12/08; H01M 2006/50; H01M 16/003
USPC ........... 429/7, 9, 428, 430–432, 506, 231.95
See application file for complete search history.

(56) References Cited

U.S. PATENT DOCUMENTS

| | | | |
|---|---|---|---|
| 5,850,136 A | * | 12/1998 | Kaneko .......................... 320/119 |
| 6,590,370 B1 | | 7/2003 | Leach |
| 6,608,470 B1 | * | 8/2003 | Oglesbee et al. ............. 320/136 |

FOREIGN PATENT DOCUMENTS

| | | | |
|---|---|---|---|
| CN | 101494037 | * | 7/2009 |
| CN | 101494037 A | | 7/2009 |

(Continued)

*Primary Examiner* — Ula C Ruddock
*Assistant Examiner* — Thomas Parsons
(74) *Attorney, Agent, or Firm* — Chip Law Group

(57) ABSTRACT

To provide a hybrid power source system in which either a solar cell or a fuel cell and a secondary cell are combined with each other, and the secondary cell is used as an electric power buffer and which can maintain a high energy efficiency even when there is a change in a charging state of the secondary cell, a change in an operating condition, or a secular change in a member, prevent overcharging of the secondary cell, and suppress thermal deterioration of the solar cell or the fuel cell due to generation of a surplus electric power unable to be taken out. A hybrid power source system is composed of a solar cell module 1 or a fuel cell module, a DC/DC converter (2) which supplies a suitable voltage to a load (3) and a secondary cell (4) after converting an electric power generated by the module into the suitable voltage, the secondary cell (4), and a shunt circuit (a constant voltage diode (6) or a shunt regulator IC) which is connected in parallel with the secondary cell (4), and which, when the secondary cell (4) is substantially in a full charging state, transforms substantially all of a surplus electric power which is not consumed in the load (3), of the generated electric power, into heat to abandon the resulting heat.

10 Claims, 6 Drawing Sheets

(56) References Cited

FOREIGN PATENT DOCUMENTS

| | | |
|---|---|---|
| JP | 10-040931 A | 2/1998 |
| JP | 2005-210776 A | 8/2005 |
| JP | 2006-501798 A | 1/2006 |
| JP | 2006-067759 A | 3/2006 |
| JP | 2006-67759 * | 9/2006 |
| JP | 2009-169327 A | 7/2009 |

* cited by examiner (a)

PRIOR ART

HYBRID POWER SOURCE SYSTEM

TECHNICAL FIELD

The present invention relates to a hybrid power source system of either a solar cell or a fuel cell, and a secondary cell such as a lithium-ion cell.

BACKGROUND ART

An electric-generating capacity which a solar cell can generate is determined depending on an irradiance level of a light and, for example, the electric-generating capacity when there is no irradiation of the light is zero. On the other hand, an electric power corresponding to an operation state of an electronic apparatus is required for a power source for driving the electronic apparatus irrespective of the irradiance level of the light. Therefore, it is obvious that the power source for stably driving the electronic apparatus cannot be composed of only the solar cell.

A hybrid power source system in which a solar cell and a secondary cell are combined with each other, and the secondary cell is used as an electric power buffer is known as a system in which a power source for stably driving an electronic apparatus is configured by using a solar cell. In this system, when the electric-generating capacity of the solar cell exceeds the electric power with which the electronic apparatus is driven, the secondary cell is charged in such a way that the excessive electric power which the solar cell generates is stored in the secondary cell. On the other hand, when the electric-generating capacity of the solar cell falls below the electric power with which the electronic apparatus is driven, the secondary cell is discharged so that the electronic apparatus is driven by the solar cell and the secondary cell.

The configuring of the hybrid power source system results in that there is no necessity for the solar cell to respond to a maximum power consumption of the electronic apparatus, and thus it is only necessary for the solar cell to supply the power consumption of the electronic apparatus on the average. As a result, it is possible to miniaturize the size of the solar cell. The hybrid power source system of the solar cell and the secondary cell can realize both of the stable supply of the electric power, and miniaturization of the solar cell, and thus is a system which is very effective for an electronic apparatus for which the miniaturization and the portableness promotion are aimed.

On the other hand, in a portable electronic apparatus such as a personal computer or a mobile phone, the power consumption has a tendency to be increased along with the high performance promotion and multi-function promotion thereof. Thus, a fuel cell is expected as a next-generation power source, for the portable electronic apparatus, which can cope with this tendency. In the fuel cell, a fuel is supplied to a negative electrode (anode) side, so that the fuel is oxidized, and air or oxygen is supplied to a positive electrode (cathode) side, so that oxygen is reduced. Thus, an oxidation-reduction reaction between the fuel and oxygen is caused in terms of the entire fuel cell. At this time, a chemical energy which the fuel has is efficiently converted into an electrical energy which is in turn taken out. The fuel cell has a feature that the fuel cell can be continuously used as a power source by supplying thereto the fuel unless the fuel cell breaks down.

Although various kinds of fuel cells have been proposed, a polymer electrolyte fuel cell (PEFC) using a hydrogen ion-conducting polymer film as an electrolyte is suitable as a portable power source because the electrolyte is a solid and is in no danger of flying-apart, the polymer electrolyte fuel cell can be operated at a lower temperature than that in any other type fuel cell, for example, at temperatures of about 30° C. to about 130° C., a start time thereof is short, and so forth.

Various kinds of combustible materials such as hydrogen and methanol can be used as the fuel of the fuel cell. However, a gas fuel such as hydrogen is unsuitable for the miniaturization and lightweight because the gas fuel requires a high-pressure container or hydrogen storing alloy for storage. On the other hand, although a liquid fuel such as methanol has an advantage that the liquid fuel is easy to store, a fuel cell utilizing a system for taking out hydrogen from the liquid fuel by using a reformer is unsuitable for the miniaturization because a construction thereof becomes complicated. Contrary to those, a direct methanol fuel cell (DMFC) in which methanol is directly supplied to an anode to be caused to make a reaction without reforming methanol has a feature that the fuel is easy to store, a construction thereof is simple, and the miniaturization is easy. Conventionally, the DMFC has been combined with the PEFC in many cases to be studied as one kind of PEFC, and thus is most highly expected as a power source for portable electronic apparatuses.

However, since an output density of the DMFC is relatively small, when the electric power with which the portable electronic apparatus is driven is tried to be generated by the fuel cell by itself, it is feared that the size of the fuel cell becomes too large. Therefore, even in the fuel cell such as the DMFC, it is effective to compose a hybrid power source system together with the secondary cell having the large output density, such as a lithium-ion cell.

Then, a hybrid power source system is proposed in Patent Document 1 which will be described later in which a fuel cell and a secondary cell are connected in parallel with a load, and at least one of the fuel cell and the secondary cell supplies an electric power to the load. FIG. 4 is a graph for explaining an operation of the power source system described above based on current-voltage characteristics of a fuel cell and a secondary cell. It is noted that voltages of the fuel cell and the secondary cell shown in FIG. 4 are not voltages of single cells, but are voltages of cell stacks in each of which plural cells are connected in series. In addition, since in a current Ir of the secondary cell, a discharge direction is taken as being positive (Ir>0), when the charging is carried out, the current Ir is negative (Ir<0).

As shown in FIG. 4, the current-voltage curve of the fuel cell has a sigmoid-like shape, and thus a generated voltage is relatively, largely reduced as a generated current is increased. The reason for this is because in the fuel cell, activation polarization, resistance polarization, and diffusion polarization remarkably appear in order with an increasing generated current. On the other hand, although the current-voltage curve of the secondary cell such as the lithium-ion cell is high in linearity, and thus a discharge voltage is gradually reduced due to the resistance polarization or the like when a discharge current is increased, a gradient of the current-voltage curve is relatively small, and thus an internal resistance is small. Similarly, during charging, although a charging voltage gradually rises when a charging current is increased, a gradient thereof is small. An open voltage Vr0 of the secondary cell is changed depending on a charging state representing how much the secondary cell is charged.

In this power source system, when there is no external load, all of the electric power generated by the fuel cell is used for charging of the secondary cell. When let Vc be the voltage at this time, let Ifc be the magnitude of the generated current of the fuel cell at this time, and let −Irc be the magnitude of the charging current of the secondary cell at this time, since the following relationship is fulfilled, $$Ifc=-Irc$$

the voltage Vc is determined as a voltage (>Vr0) fulfilling this relationship in FIG. 4. When the external load is not zero, but is small, a part of the electric power generated by the fuel cell is used for driving of the load, and a surplus electric power is used for charging of the secondary cell. The voltage at this time is smaller than Vc, and is larger than Vr0.

When the load is larger and the voltage is smaller than Vr0, the discharging of the secondary cell is caused, and thus the load is driven by the fuel cell and the secondary cell. In this case, in order that each of the cells may effectively function, as shown in FIG. 4, the current-voltage curves of the two cells need to cross with each other in a suitable area. If this situation is met, when the load is relatively small, and a voltage V1 with which the load is driven is larger than a voltage Vx at an intersection point X, the currents supplied from the fuel cell and the secondary cell, as shown in FIG. 4, are determined as If1 and Ir1, respectively. Since If1>Ir1, the electric power is mainly supplied from the fuel cell. On the other hand, when the load is large and a drive voltage V2 is smaller than Vx, the currents supplied from the fuel cell and the secondary cell, as shown in FIG. 4, are determined as If2 and Ir2, respectively. Since If2<Ir2, in this case, the electric power supplied from the secondary cell exceeds the electric power supplied from the fuel cell.

It is understood that while the load is increased, so that the drive voltage is decreased from V1 to V2 through Vx, the generated current from the fuel cell is merely increased from If1 to If2, whereas the discharge current from the secondary cell is largely increased from Ir1 to Ir2, a most part of the power consumption increased for this period of time is supplied from the secondary cell. In addition, when an increase in the power consumption is borne by only the fuel cell, as can be seen from FIG. 4, the generated voltage of the fuel cell is reduced so as to be smaller than a minimum voltage with which the load can be driven. As described above, when the power source is composed of only the fuel cell, the fuel cell needs to grow in size in such a way that the generated voltage equal to or larger than the minimum drive voltage can be maintained. In addition, when the secondary cell which is excellent in the output density is connected in parallel with the fuel cell, thereby configuring the hybrid power source, the fuel cell can be miniaturized and the entire power source system can be miniaturized in turn.

However, in the power source system described above, the current-voltage curves of the fuel cell and the secondary cell need to cross with each other in a suitable area. In addition thereto, the system characteristics are perfectly determined by these current-voltage characteristics. In a simple system in which either the solar cell or the fuel cell, and the secondary cell are merely connected in parallel with each other like this example, since the characteristics of the solar cell or the fuel cell, and the characteristics of the secondary cell are mutually restricted, and the characteristics when the secondary cell is charged, and the characteristics when the secondary cell is discharged are mutually restricted, there is a limit to an improvement in the energy efficiency, the stability, and the convenience. For example, the energy efficiency is dominated by the characteristics of each of the cells and the charging state of the secondary cell, and the stability is largely influenced by the secular change or the like of the characteristics of each of the cells. In addition, it is impossible to use the various kinds of charging systems such as the high-efficiency charging and the fast charging appropriately.

In addition, in the hybrid power source system, the prevention of the overcharging of the secondary cell is a very important problem. For example, when the lithium-ion cell is used as the secondary cell, the overcharging causes dangerousness such as smoke generation and firing, and explosion as the case may be. Since the solar cell generates the electric power when the light is irradiated to the solar cell, there is required some sort of mechanism for usually detecting the charging state of the secondary cell, and stopping the charging when the full charging is reached. In addition, since the electric power generation is carried out even in a passive type fuel cell not having means for controlling the supply of the fuel on a steady basis, the same mechanism is required.

Then, a portable power source apparatus with a battery charger including a DC/DC converter, a current controlling circuit, and an overcurrent preventing circuit is proposed in Patent Document 2 which will be described later. FIG. 5(a) is a schematic diagram showing a configuration of a power source apparatus 100.

As shown in FIG. 5(a), in the power source apparatus 100, a solar cell 101 for generating an electric power by receiving a solar light is connected to an electric double layer capacitor 103 through a backflow preventing diode 102, and the electric power which the solar cell 101 generates is temporarily stored in the capacitor 103. After the electric power stored in the capacitor 103 is converted into a suitable voltage by a DC/DC converter 105, the resulting voltage is supplied to each of a load 104 and a secondary cell 106.

In addition, in the power source apparatus 100, as a feature thereof, a current controlling circuit 107 is provided between the DC/DC converter 105, and the secondary cell 106 and the load 104, and an overcurrent preventing circuit 108 is provided between the current controlling circuit 107 and the secondary cell 106.

FIG. 5(b) is a schematic diagram of the current controlling circuit 107 exemplified in Patent Document 2. The current controlling circuit 107 is configured similarly to a control circuit of a general series regulator. That is to say, division resistors 111 and 112 divide an output voltage to give a reference voltage Vref1. A constant voltage diode 113 generates a standard voltage. A control transistor 114 and a load resistor 115 thereof amplify a difference between the standard voltage (strictly, a sum of the standard voltage, and a base-to-emitter voltage of the control transistor 114 and the reference voltage Vref1, and controls an operation of a power transistor 116 depending on small and large of the difference. The power transistor 116 is inserted in series in the load 104, and a conductive property thereof is controlled by the control transistor 114 in such a way that an output voltage thereof becomes constant. A concrete configuration of the overcurrent preventing circuit 108 is not shown in Patent Document 2.

In the power source apparatus 100, when the electric power generated by the solar cell 101 exceeds the electric power with which the load 104 is driven, the secondary cell 106 is charged with the electric power for a surplus. When the secondary cell 106 reaches a full charging state, the charging for the secondary cell 106 is stopped by the overcurrent preventing circuit 108. Therefore, the secondary cell 106 is prevented from being overcharged. At this time, since the surplus electric power is accumulated in the electric double layer capacitor 103, a voltage of the capacitor 103 rises. As a result, since the voltage applied to the load 104 is controlled to a predetermined voltage by the current controlling circuit 107 even when the output voltage from the DC/DC converter 105 rises, an excessive voltage is prevented from being applied to the load 104.

In this case, since the surplus electric power which the solar cell 101 generates has nowhere to go, there is feared a rise in the voltage of the capacitor 103 due to the accumulation of the surplus electric power. It is described in Patent Document 2 that the rise in the voltage of the capacitor 103 is suppressed because the surplus electric power is consumed by the control transistor 114 and the load resistor 115 thereof.

On the other hand, seven kinds of apparatuses are shown in Patent Document 3 which will be described later, as a power source apparatus with which under any weather, an electric power obtained from a solar cell can be utilized at a maximum. FIG. 6 is schematic diagrams showing configurations of the two kinds of power source apparatuses, each having a relation with the present invention, of them.

In a power source apparatus 200 shown in FIG. 6(a), a solar cell module 201 is connected to each of a load 203 and a secondary cell 204 through a backflow preventing diode 202. In this case, as a feature of the power source apparatus 200, the power source apparatus 200 is configured in such a way that a sum of a voltage for a forward voltage drop of the backflow preventing diode 202, and a voltage of the secondary cell 204 becomes approximately equal to an optimal operating voltage of the solar cell module 201. In the power source apparatus 200, when the electric power generated by the solar cell module 201 exceeds an electric power with which the load 203 is driven, the secondary cell 204 is charged with an electric power for a surplus. However, since the power source apparatus 200 is configured in the manner as described above, the electric power obtained from the solar cell module 201 can be utilized at a maximum.

In addition, as another feature of the power source apparatus 200, a shunt regulator 207 is connected in parallel with each of the load 203 and the secondary cell 204. The shunt regulator 207 is controlled in accordance with a reference voltage Vref1 obtained by dividing an output voltage by division resistors 205 and 206. Also, the shunt regulator 207 is set in such a way that a maximum value of the output voltage is suppressed to a predetermined voltage smaller than an overcharging voltage which causes overcharging of the secondary cell 204.

In the power source apparatus 200, since, while the secondary cell 204 does not reach a full charging state, and thus the secondary cell 204 is normally charged with the surplus electric power, the output voltage is held at a voltage smaller than the overcharging voltage by the charging, a voltage limitation by the shunt regulator 207 is not carried out. On the other hand, since the surplus electric power is not consumed by the charging, but is accumulated when the secondary cell 204 reaches the full charging state, the output voltage begins to be increased at once and is attempting to exceed the overcharging voltage of the secondary cell 204. At this time, a voltage limiting operation by the shunt regulator 207 is immediately exhibited, and the surplus electric power is shunted through the shunt regulator 207 and is then transformed into heat by a resistance component within the shunt regulator 207 to be abandoned. As a result, since the output voltage is held at the predetermined voltage smaller than the overcharging voltage of the secondary cell 204, the secondary cell 204 is prevented from being overcharged.

In a power source apparatus 300 shown in FIG. 6(b), after an electric power which a solar cell module 201 generates is converted into a suitable voltage by a DC/DC converter 301, the resulting voltage is supplied to each of a load 203 and a secondary cell 204. As a feature of the power source apparatus 300, the power source apparatus 300 is configured in such a way that division resistors 302 and 303 for giving a reference voltage Vref2 by dividing an output voltage from the solar cell module 201 are provided on an input side of the DC/DC converter 301, a difference between the reference voltage Vref2 and a built-in standard voltage is amplified by an error amplifier 304, and an operation of the DC/DC converter is controlled based on a magnitude of the amplified difference, whereby the output voltage from the solar cell module 201 is held at an optimal operating voltage thereof.

In addition, division resistors 205 and 206 for giving a reference voltage Vref1 by dividing an output voltage, and a comparator 305 for detecting the overcharging of the secondary cell 204 by comparing the reference voltage Vref1 and the standard voltage are provided on an output side of the DC/DC converter 301. Also, an AND circuit for stopping an operation of the converter when the overcharging is detected by the comparator 305 is provided within the DC/DC converter. Therefore, the output voltage from the DC/DC converter 301 is held at the predetermined voltage smaller than the voltage which causes the overcharging of the secondary cell 204, and thus the secondary cell 204 is prevented from being overcharged.

PRIOR ART DOCUMENTS

Patent Documents

Patent Document 1: Japanese Patent Laid-Open No. Hei 10-40931 (pages 2 and 7, FIGS. 1 and 4)
Patent Document 2: Japanese Patent Laid-Open No. 2005-210776 (page 5, especially, paragraph 0031, FIGS. 1 and 3)
Patent Document 3: Japanese Patent Laid-Open No. 2006-67759 (pages 5 and 6, and 10 to 13, FIGS. 1 to 4 and 15 to 18)

SUMMARY OF THE INVENTION

In the power source apparatus 100 proposed in Patent Document 2, although when the electric power generated by the solar cell 101 exceeds the electric power with which the load 104 is driven, the overcharging of the secondary cell 106 is prevented by the overcurrent preventing circuit 108, there is feared the accumulation of the surplus electric power which has nowhere to go. Although it is described in Patent Document 2 that the surplus electric power is consumed by the control transistor 114 and the load resistor 115 thereof, it is impossible to look to the control transistor 114 for a current capacity comparable to that of the power transistor 116. If a configuration is adopted such that a transistor having a current capacity comparable to that of the power transistor 116 is used as the control transistor 114, and all of the surplus electric power is shunted through the control transistor 114 and the load resistor 115 thereof, and is then transformed into the heat to be abandoned, although the surplus electric power is prevented from being accumulated, the large amount of electric power are consumed through the control transistor 114 and the load resistor 115 even when the secondary cell 106 is not in the full charging state, and the power source performance becomes worse to the inadmissible degree.

Therefore, in the power source apparatus 100, when the secondary cell 106 becomes the full charging state, it becomes impossible to take out the surplus electric power which the solar cell 101 generates, and thus an energy conversion efficiency of the solar cell 101 is effectively reduced. As a result, there is caused a problem that the temperature of the solar cell 101 becomes too high. That is to say, when the energy of the light absorbed by the solar cell 101 is W, the efficiency of the conversion to the electric power is $\eta_0$, and all of the electric power generated is taken out, of W, an energy $Q_0$ which is not converted into the electric power, but turns into the thermal energy to cause the temperature rise of the solar cell 101 is:

$$Q_0 = (1-\eta_0)W$$

On the other hand, when the effective conversion efficiency is reduced to $\eta(<\eta_0)$ resulting from that the surplus electric power cannot be taken out, the energy Q which turns into the thermal energy, and thus causes the temperature rise of the solar cell 101 is changed into:

$$Q = (1-\eta)W$$

Since the following relationship is fulfilled, $$Q - Q_0 = (\eta_0 - \eta)W > 0$$

the energy which turns into the thermal energy only for the effective reduction of the conversion efficiency, and causes the temperature rise of the solar cell 101 is increased, and thus the temperature of the solar cell 101 rises.

In the case where in the power source apparatus 300 as well proposed in Patent Document 3, the electric power generated by the solar cell module 201 exceeds the electric power with which the load 203 is driven, since the operation of the DC/DC converter 301 is stopped when the comparator 305 detects the overcharging of the secondary cell 204, it becomes impossible to take out the surplus electric power of the solar cell module 201, and thus the same problem is caused.

The temperature rise of the solar cell especially becomes a problem in a dye-sensitized solar cell. Although various kinds of deterioration causes such as the deterioration following the electric power generation, the light deterioration, and the thermal deterioration are considered in the solar cell, it is reported that in the dye-sensitized solar cell, the thermal deterioration speedily proceeds due to the temperature rise (refer to Japanese Patent Laid-Open No. 2005-158621, and P. M. Sommeling, M. Spath, H. J. P. Smit, N. J. Bakker, J. M. Kroon, "Long-term stability testing of dye-sensitized solar cells," Journal of Photochemistry and Photobiology. A. Chemistry, 164 (1-3), (2004), 137-144.). Therefore, in the dye-sensitized solar cell, it is necessary to suppress the temperature rise.

In the fuel cell as well, the situation in which the surplus electric power cannot be taken out becomes a very large problem. When the surplus electric power cannot be taken out, the generated electric current of the fuel cell is reduced, and an electric potential of a cathode of the fuel cell rises along with this. As a result, there is caused the possibility that the oxidation-reduction equilibrium on the cathode surface is shifted to the oxidation side, and thus a metal such as platinum as an electrode catalyst material is eluted as ions. When this situation continues for a long time, it is feared that a cathode catalyst wastes away step by step to drop off from the electrode. In addition, there is also feared the dangerousness that the eluted ions re-precipitate within an electrolyte film or the like to destroy the electrolyte film.

On the other hand, in the power source apparatus 200 proposed in Patent Document 3, when the secondary cell 204 reaches the full charging state in the case where the electric power generated by the solar cell module 201 exceeds the electric power with which the load 203 is driven, the surplus electric power is shunted through the shunt regulator 207, and is then transformed into the heat to be abandoned. Therefore, the secondary cell 204 is prevented from being overcharged. In addition thereto, it is also prevented that the surplus electric power becomes unable to be taken out, and thus the conversion efficiency of the solar cell module 201 is effectively reduced, thereby not causing the temperature rise of the solar cell module 201.

However, since the power source apparatus 200 does not include direct-current voltage converting means such as a DC/DC converter or the like, there is a limit to the improvement in the energy efficiency, the stability, and the convenience. For example, when an amount of charging in the secondary cell 204 is less, and thus a difference between the optimal operating voltage of the solar cell module 201 and the voltage of the secondary cell 204 is large, the electric power which turns into the loss in the process of the charging of the secondary cell 204 becomes large, and thus the energy efficiency of the system is reduced. In addition, when the output voltage from the solar cell module 201 becomes lower than the voltage of the secondary cell 204 owing to a change in an operating condition such as cloudy weather, or the like, the electric power with which the load 203 is driven is exclusively supplied from the secondary cell 204, and thus a state in which the electric power which the solar cell module 201 generates is not utilized at all may be caused. In addition, when the optimal operating voltage of the solar cell module 201, and the characteristics of the secondary cell 204 are changed due to the secular change or the like, the possibility that the original performance is remarkably impaired is high.

As described above, a hybrid power source system has not been yet proposed in which either a solar cell or a fuel cell and a secondary cell are combined with each other, and the secondary cell is used as an electric power buffer, and which can maintain a high energy efficiency even when there is a change in a charging state of the secondary cell, a change in an operating condition, or a secular change in a member, prevent overcharging of the secondary cell, and suppress thermal deterioration of the solar cell due to generation of a surplus electric power unable to be taken out or elution of a cathode catalyst in the fuel cell.

The present invention has been made in order to solve the problems described above, and it is therefore an object of the present invention to provide a hybrid power source system in which either a solar cell or a fuel cell and a secondary cell are combined with each other, and the secondary cell is used as an electric power buffer, and which can maintain a high energy efficiency even when there is a change in a charging state of the secondary cell, a change in an operating condition, or a secular change in a member, prevent overcharging of the secondary cell, and suppress thermal deterioration of the solar cell due to generation of a surplus electric power unable to be taken out or elution of a cathode catalyst in the fuel cell.

That is to say, the present invention relates to a hybrid power source system including:

a solar cell module or a fuel cell module;

direct-current voltage converting means for supplying a suitable voltage to a load and a secondary cell after the solar cell module or the fuel cell module is connected to an input side, the load and the secondary cell is connected to an output side, and a generated electric power which the solar cell module or the fuel cell module generates is converted into the suitable voltage;

the secondary cell connected in parallel with the load on the output side of the direct-current voltage converting means; and a shunt circuit connected in parallel with the secondary cell on the output side of the direct-current voltage converting means, the shunt circuit serving to transform substantially all of a surplus electric power which is not consumed in the load, of the generated electric power, into heat to abandon the resulting heat when the secondary cell is substantially in a full charging state.

Here, "substantially in a full charging state" of "the secondary cell is substantially in a full charging state" means a charging state in which the electric power approximately equal to that in a full charging state is accumulated, and a performance required for the hybrid power source system can be realized similarly to in the full charging state in addition to the full charging state in a strict sense, that is, means that a charging state which is regarded as being approximately equal to the full charging state in terms of a system performance is also included. In addition, "substantially all" of "substantially all of a surplus electric power" means "all except for an electric power necessarily consumed in a circuit, necessary for normally operating a circuit, such as a short-circuit preventing resistor, and a voltage detecting resistor or a control circuit."

In the hybrid power source system of the present invention, the generated electric power which the solar cell module or the fuel cell module generates is supplied to each of the load and the secondary cell connected in parallel with each other. Also, when the generated electric power exceeds the electric power with which the load is driven, the secondary cell is charged in such a way that the surplus electric power is stored in the secondary cell. On the other hand, when the generated electric power falls below the electric power with which the load is driven, the secondary cell is discharged, and the load is driven by either the solar cell module or the fuel cell module and the secondary cell. As a result, there is no necessity for the solar cell module or the fuel cell module to respond to the maximum power consumption of the load, and it is only necessary to supply the power consumption of the load on the average. Therefore, it is possible to miniaturize the size of the solar cell module or the fuel cell module.

In this case, the hybrid power source system of the present invention, as a feature thereof, has the direct-current voltage converting means to supply a suitable voltage to the load and the secondary cell after the generated electric power is converted into the suitable voltage. As a result, the loss when the secondary cell is charged can be suppressed to the minimum. In addition, when the secondary cell is discharged, it is possible to effectively utilize both of either the solar cell module or the fuel cell module and the secondary cell. In addition, even when the operating condition such as the fine weather or the cloudy weather is changed or even when the characteristics of the members are charged due to the secular change or the like, it is possible to maintain the high energy efficiency.

Moreover, the hybrid power source system of the present invention, as a feature thereof, has the shunt circuit which is connected in parallel with the secondary cell on the output side of the direct-current voltage converting means, and which, when the secondary cell is in the full charging state, transforms substantially all of the surplus electric power which is not consumed in the load, into the heat to abandon the resulting heat. Therefore, the secondary cell is prevented from being overcharged. In addition thereto, it is prevented that it is impossible to take out the surplus electric power from the solar cell module or the fuel cell module. As a result, when the solar cell module is used, it is prevented that the efficiency of the conversion to the electric power is effectively reduced to cause the temperature rise, thereby accelerating the thermal deterioration of the solar cell module. In addition, when the fuel cell is used, it is prevented that the cathode electric potential of the fuel cell rises to accelerate the deterioration due to the elution of the cathode catalyst.

MODES FOR CARRYING OUT THE INVENTION

In a hybrid power source system of the present invention, it is better that an output voltage from the direct-current voltage converting means is set slightly higher than a voltage of the secondary cell.

Or, it is better that an input side voltage of the direct-current voltage converting means is controlled by the direct-current voltage converting means so as to become an optimal operating voltage of the solar cell module or the fuel cell module or the vicinity thereof.

In addition, it is better that the shunt circuit is composed of a constant voltage diode, a Zener voltage thereof is a voltage having a magnitude which enables the secondary cell to be substantially in a full charging state, and also having a magnitude which prevents an overcharging state of the secondary cell.

Or, it is better that the shunt circuit is composed of plural diodes connected in series, and a sum of forward voltage drops of the diodes is a voltage having a magnitude which enables the secondary cell to be substantially in a full charging state, and also having a magnitude which prevents an overcharging state of the secondary cell.

Or, it is better that the shunt circuit is composed of a shunt regulator circuit having a shunt path composed of a transistor, and a maximum value of a voltage applied across terminals of the secondary cell is limited to a voltage having a magnitude which enables the secondary cell to be substantially in a full charging state and also having the magnitude which prevents an overcharging state of the secondary cell by the shunt regulator circuit.

In this case, it is better that the maximum value of the voltage limited by the shunt regulator circuit is set by comparison between a reference voltage obtained by dividing the voltage by using a division resistor, and an internal standard voltage which the shunt regulator circuit has.

In addition, it is better that the solar cell is a dye-sensitized solar cell.

In addition, it is better that the fuel cell is a direct methanol fuel cell.

In addition, it is better that the secondary cell is a lithium-ion cell.

Next, preferred embodiments of the present invention will be described concretely and in detail with reference to the drawings.

Embodiment 1

In Embodiment 1, an example of a hybrid power source system described in claims 1, 2, 4, and 5 will be mainly described.

Figure 1:
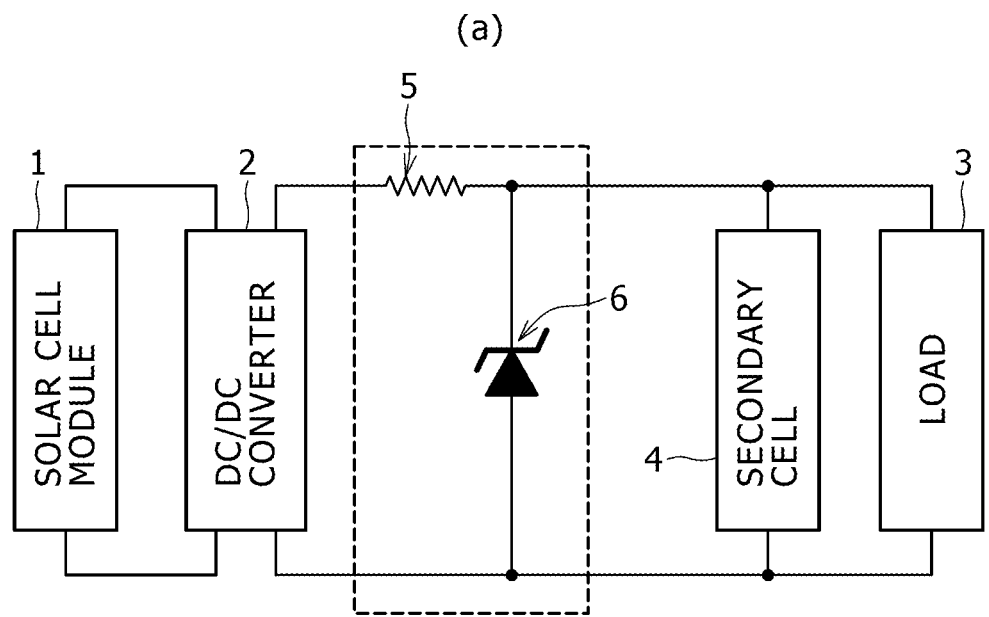
FIG. 1 is schematic diagrams showing configuration of a hybrid power source system 10(a) and a hybrid power source system 11(b) based on Embodiment 1 of the present invention and a modified example thereof.
Figure 1:
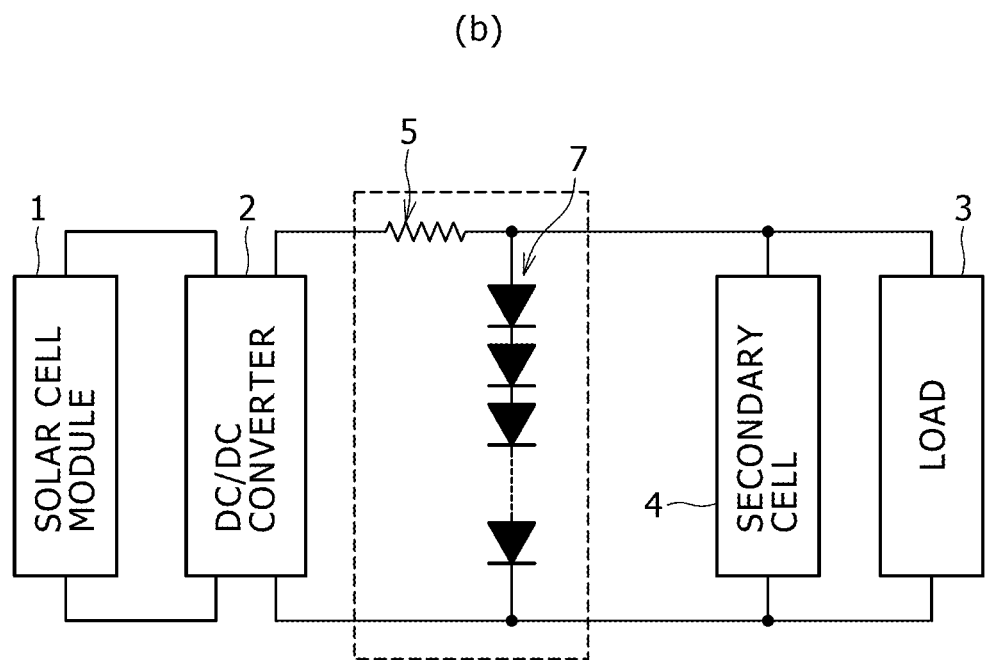

FIG. 1(a) is a schematic diagram showing a configuration of a hybrid power source system 10 based on Embodiment 1. The hybrid power source system 10 is composed of a solar cell module 1, a DC/DC converter 2 as the direct-current voltage converting means described above, a secondary cell 4, a resistor 5, and a constant voltage diode 6, and the solar cell module 1 is connected to an input side of the DC/DC converter 2 and a load 3 and the secondary cell 4 are connected in parallel with each other on an output side of the DC/DC converter 2.

In the hybrid power source system 10, after an electric power which the solar cell module 1 generates is converted into a suitable voltage by the DC/DC converter 2, the resulting suitable voltage is supplied to the load 3 and the secondary cell 4. Also, when the generated electric power exceeds an electric power with which the load 3 is driven, the secondary cell 4 is charged in such a way that a surplus generated electric power is stored in the secondary cell 4. On the other hand, when the generated electric power falls below an electric power with which the load 3 is driven, the secondary cell 4 is discharged, so that the load 3 is driven by the solar cell module 1 and the secondary cell 4. As a result, since there is no necessity for the solar cell module 1 to respond to the maximum power consumption of the load 3, and it is only necessary to supply the power consumption of the load 3 on the average, it is possible to miniaturize the size of the solar cell module 1.

In this case, it is better that an output voltage from the DC/DC converter 2 is set slightly higher than a voltage of the secondary cell 4. When such setting is adopted, a loss when the secondary cell 4 is charged can be suppressed to a minimum. In addition, when the secondary cell 4 is discharged, it is possible to effectively utilize both of the solar cell module 1 and the secondary cell 4. Since the hybrid power source system 10 has the DC/DC converter 2, such fine control can be made and it is possible to realize a high energy efficiency. In addition, even when an operating condition such as the fine weather or the cloudy weather is changed, or even when characteristics of the solar cell module 1 and the secondary cell 4 are changed due to a secular change or the like, it is possible to fulfill the condition described above, and maintain the high energy efficiency.

In addition thereto, the hybrid power source system 10, as a feature thereof, has the constant voltage diode 6 connected in parallel with the secondary cell 4 as the shunt circuit on the output side of the DC/DC converter 2. A Zener voltage of the constant voltage diode 6 is a voltage having a magnitude which enables the secondary cell 4 to be substantially in a full charging state, and also having a magnitude which prevents an overcharging state of the secondary cell 4.

As a result, when the electric power generated by the solar cell module 1 exceeds the electric power with which the load 3 is driven, the hybrid power source system 10 carries out two kinds of different operations so as to correspond to the charging state of the secondary cell 4.

That is to say, when the secondary cell 4 does not reach the substantial full charging state, the surplus electric power is consumed through the charging of the secondary cell 4. Therefore, the voltage developed across the terminals of the secondary cell 4 is held sufficiently smaller than the full charging voltage, and thus is prevented from exceeding the Zener voltage. At this time, a small reverse leakage current is merely caused to flow through the constant voltage diode 6, and thus the great part of the surplus electric power is used for the charging of the secondary cell 4.

On the other hand, when the secondary cell 4 substantially reaches the full charging state, the surplus electric power is not consumed through the charging, but is accumulated. Therefore, the voltage developed across the terminals of the secondary cell 4 begins to be increased at once, and is attempting to exceed the Zener voltage. At this time, a Zener current is immediately caused to flow through the constant voltage diode 6, so that a current caused to flow through the resistor 5 is increased. As a result, since a voltage drop in the resistor 5 is increased, the voltage developed across the terminals of the secondary cell 4 is held at the Zener voltage. Owing to a voltage limiting operation by the constant voltage diode 6, the charging for the secondary cell 4 is automatically stopped at the time when the voltage developed across the terminals reaches the Zener voltage, and thus the secondary cell 4 is prevented from being overcharged. In addition thereto, the surplus electric power is shunted through the constant voltage diode 6, and is then transferred into heat by a resistance component which the constant voltage diode 6 has and abandoned. Therefore, it is also prevented that the surplus electric power becomes unable to be taken out from the solar cell module 1, which results in that the conversion efficiency of the solar cell is effectively reduced to cause the temperature rise, thereby accelerating the thermal deterioration of the solar cell module 1.

It is better that the solar cell of the solar cell module 1 is a dye-sensitized solar cell. Previously stated, since the thermal deterioration is easy to cause in the dye-sensitized solar cell, and thus it is necessary to suppress the temperature rise, the present invention can be suitably applied thereto. In addition, although in Embodiment 1, there has been shown an example in which the electric power source is the solar cell module, as previously stated, the present invention can be suitably applied to the passive type fuel cell as well which does not have means for controlling the supply of the fuel. Although the fuel cell is not limited, it is especially better that the fuel cell is a direct methanol fuel cell which is suitable as a power source for portable apparatuses.

In addition, it is better that the secondary cell described above is a lithium-ion cell. The lithium-ion cell is most preferable as the secondary cell used in this system because an output density is large and thus a loss due to a difference between the charging voltage and the discharging voltage is less as compared with a nickel-hydrogen cell, a nickel-cadmium cell, or the like. Although differing depending on a composition as well of the electrodes, a full charging voltage of the lithium-ion cell is about 4.0 to about 4.2 V. In addition, an overcharging voltage is a level obtained by adding 0.1 to 0.2 V to the full charging voltage. When the lithium-ion cell in which the full charging voltage is 4.2 V and the overcharging voltage is 4.4 V is used as the secondary cell described above, it is better that the Zener voltage of the constant voltage diode 6 is set in the range of about 4.1 to about 4.2 V. When the Zener voltage is 4.2 V, the lithium-ion cell can be charged to the full charging state. When the Zener voltage is equal to or larger than 4.1 V and smaller than 4.2 V, although the lithium-ion cell cannot be charged to the full charging state in the strict sense of the word, the electric power approximately equal to that in the full charging state can be accumulated, and thus the lithium-ion cell can be charged to the substantial full charging state in which the performance required for the hybrid power source system 10 can be realized similarly to the full charging state. It is better that those are suitably selected depending on the manufacture precision of the constant voltage diode 6, the system performance required, and the like. In addition, it is better that the output voltage from the DC/DC converter 2 is set to such a magnitude that a voltage drop ΔV (=IR; however, I is a charge or discharge current caused to flow through a cell) due to an internal resistance R of the cell is added to (in a phase of charging) or subtracted from (in a phase of discharging) an open voltage of the lithium-ion cell. In this case, the hybrid power source system 10 can be operated with the highest energy efficiency.

FIG. 1(b) is a schematic diagram showing a configuration of a hybrid power source system 11 based on a modified example of Embodiment 1. This example corresponds to claim 5 and is an example in which plural diodes 7 connected in series in a forward direction are provided as the shunt circuit described above instead of the constant voltage diode 6. A sum of forward voltage drops of the diodes is a voltage having a magnitude which enables the secondary cell 4 to be substantially in the full charging state, and also having a magnitude which prevents the overcharging state of the secondary cell 4. In the hybrid power source system 11, when the secondary cell 4 becomes the full charging state, and thus the output voltage from the DC/DC converter 2 is attempting to exceed the voltage causing the overcharging, a forward current is immediately caused to flow through the diode row 7. Thus, the same effects as those in the hybrid power source system 10 are obtained.

Embodiment 2

In Embodiment 2, an example of a hybrid power source system described in claims 6 and 7 will be mainly described.

Figure 2:
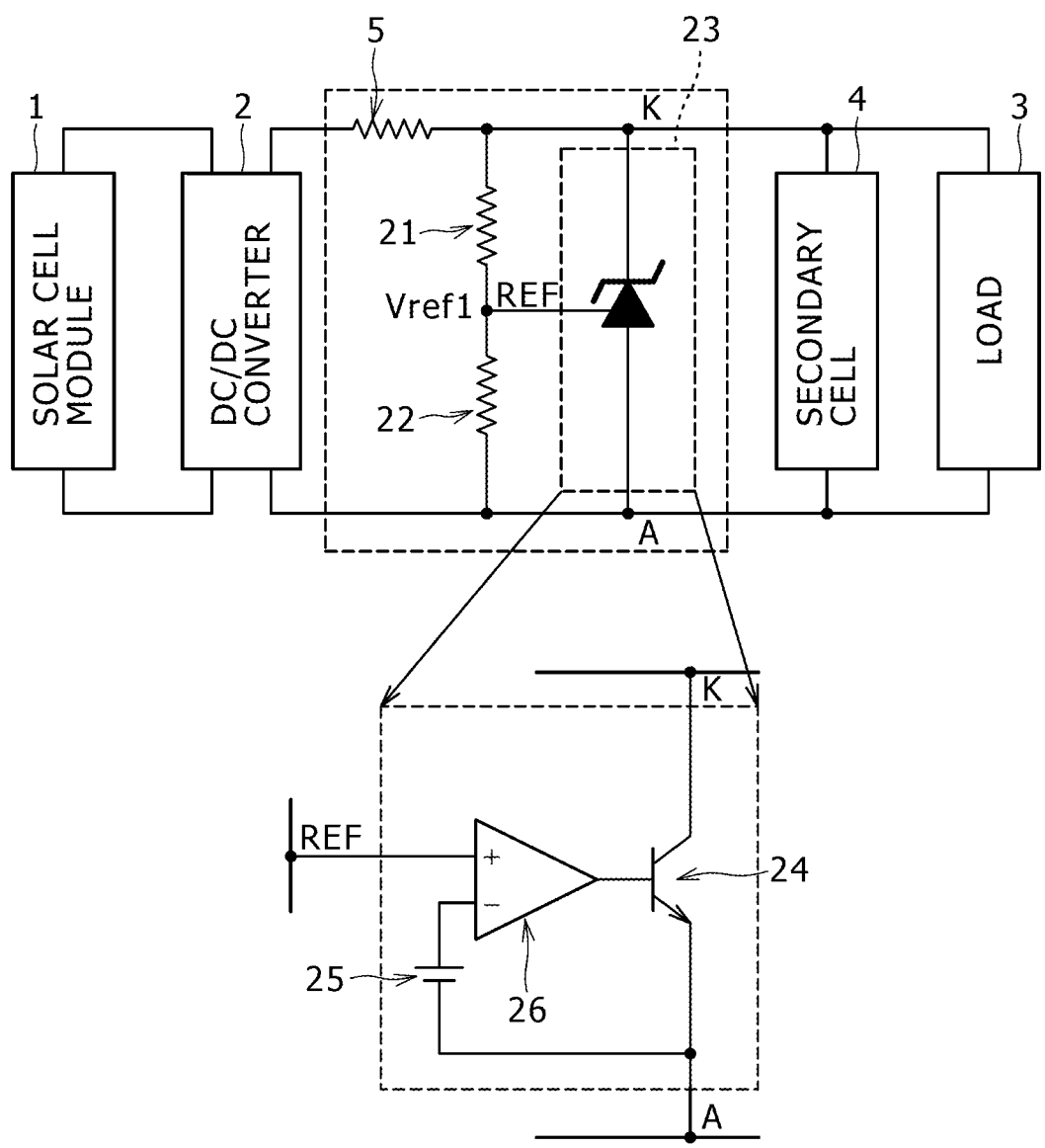
FIG. 2 is a schematic diagram showing a configuration of a hybrid power source system 20 based on Embodiment 2 of the present invention.

FIG. 2 is a schematic diagram showing a configuration of a hybrid power source system 20 based on Embodiment 2. The hybrid power source system 20 is composed of a solar cell module 1, a DC/DC converter 2 as the direct-current voltage converting means described above, a secondary cell 4, a resistor 5, division resistors 21 and 22, and a shunt regulator circuit 23. In the hybrid power source system 20, the shunt regulator circuit 23 is used as the shunt circuit described above instead of the constant voltage diode 6, and the division resistors 21 and 22 are provided. Since portions other than those are the same as those in the hybrid power source system 10, points of difference will be mainly described.

The shunt regulator circuit 23, as shown in an enlarged diagram, is composed of a shunt path composed of a transistor 24 connected in parallel with the secondary cell 4, a standard voltage generating portion 25 for generating a standard voltage Vs, an error amplifier 26, and the like. The division resistors 21 and 22 divide a voltage developed across terminals of the secondary cell 4 to give a reference voltage Vref1 which is applied to a reference voltage terminal REF.

When Vref1 is smaller than Vs, since a difference between Vref1 and Vs is amplified by the error amplifier 26 and the resulting difference is then applied to a base terminal of the transistor 24, the transistor 24 becomes a perfect OFF state. On the other hand, when Vref1 is larger than Vs, since a difference between Vref1 and Vs is amplified by the error amplifier 26 and the resulting difference is then applied to the base terminal of the transistor 24, the transistor 24 becomes an ON state. Thus, since a current is caused to flow through the shunt path composed of the transistor 24, a current caused to flow through the resistor 5 is increased. As a result, a voltage drop in the resistor 5 becomes large, and thus a voltage developed across an anode terminal A and a cathode terminal K of the shunt regulator circuit 23 is reduced to a magnitude with which the following relationship is fulfilled:

$$Vref1 = Vs$$

When let Vmax be this voltage, and resistance values of the division resistors 21 and 22 are taken to be R21 and R22, respectively, Vmax is given by the following expression:

$$Vmax = (R21/R22 + 1)Vs$$

In the hybrid power source system 20, R21 and R22 are suitably selected, whereby Vmax is set to a magnitude which enables the secondary cell 4 to become substantially the full charging state, and which prevents the overcharging state of the secondary cell 4.

As a result, when the generated electric power of the solar cell module 1 exceeds the electric power with which the load 3 is driven, the hybrid power source system 20 carries out two kinds of different operations so as to correspond to the charging state of the secondary cell 4.

That is to say, when the secondary cell 4 does not reach the substantial full charging state, the surplus electric power is consumed through the charging of the secondary cell 4. Therefore, the voltage developed across the terminals of the secondary cell 4 is held sufficiently smaller than the full charging voltage, and thus is prevented from becoming equal to or larger than the Vmax. At this time, since the following relationship is established, $$Vref1 < Vs$$

the transistor 24 is in the perfect OFF state. Therefore, the current caused to flow through the shunt path composed of the transistor 24 is very small, and thus almost all surplus electric power is used for the charging of the secondary cell 4.

On the other hand, when the secondary cell 4 substantially reaches the full charging state, the surplus electric power is not consumed through the charging, but is accumulated. Therefore, the voltage developed across the terminals of the secondary cell 4 begins to be increased at once, and is attempting to exceed Vmax. At this time, since the following relationship is established, $$Vref1 > Vs$$

the transistor 24 immediately becomes the ON state, the current is caused to flow through the transistor 24, and thus the current caused to flow through the resistor 5 is increased. As a result, since the voltage drop in the resistor 5 is increased, the voltage developed across the anode terminal A and the cathode terminal K of the shunt regulator circuit 23 is held equal to a magnitude with which the following relationship is fulfilled, $$Vref1 = Vs$$

that is, Vmax. Owing to a voltage limiting operation by the shunt regulator circuit 23, the charging for the secondary cell 4 is automatically stopped at the time when the voltage developed across the terminals reaches Vmax, and thus the secondary cell 4 is prevented from being overcharged. In addition thereto, the surplus electric power is shunted through the transistor 24, and is then transferred into heat by a resistance component which the transistor 24 has and abandoned. Therefore, it is also prevented that the surplus electric power becomes unable to be taken out from the solar cell module 1, which results in that the conversion efficiency of the solar cell is effectively reduced to cause the temperature rise, thereby accelerating the thermal deterioration of the solar cell module 1.

When the lithium-ion cell in which the full charging voltage is 4.2 V and the overcharging voltage is 4.4 V is used as the secondary cell described above, it is better that Vmax is set to about 4.2 V. As a result, the lithium-ion cell can be charged to the full charging state, and thus it is possible to realize the best system performance.

Although in FIG. 2, there is shown the example in which the transistor 24 is a bipolar transistor, the transistor 24 may also be a field-effect transistor. Although the shunt regulator circuit 23 may be composed of a discrete component(s), it is convenient to use a commercially available shunt regulator IC (Integrated Circuit) element. In addition, a resistor and the transistor 24 connected in series with each other may be connected in parallel with the secondary cell 4, and a part of the surplus electric power may be caused to turn into the heat in the resistor. The adoption of such a configuration is desirable because the heat generation in the transistor 24 becomes small.

The shunt regulator circuit 23 is used in the manner as described above, whereby it is possible to configure the hybrid power source system 20 similarly to Embodiment 1. The system 20 using this shunt regulator circuit 23 is a system having the highest practical utility in which Vmax can be precisely set, the energy loss is small, and so forth. Although the system 10 using the constant voltage diode 6 shown in FIG. 1(a) is simple in terms of the circuit, since a small reverse current is caused to flow even when the secondary cell 4 is not in the full charging state, the energy efficiency is reduced as compared with the system using the shunt regulator circuit 23. The system 11 using the general diodes shown in FIG. 1(b) has a drawback that it is difficult to precisely determine the voltage to be limited.

Embodiment 3

In Embodiment 3, an example of a hybrid power source system described in claim 3 will be mainly described.

Figure 3:
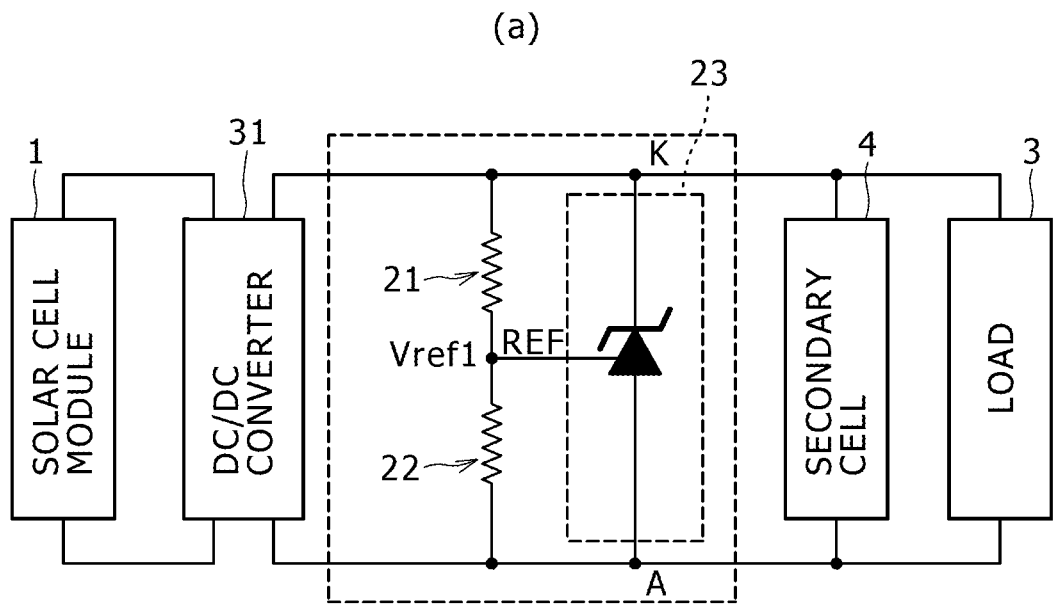
FIG. 3 is a schematic diagram (a) showing a configuration of a hybrid power source system 30 based on Embodiment 3 of the present invention, and a graph (b) showing an electric power generation characteristics of a solar cell module.
Figure 3:
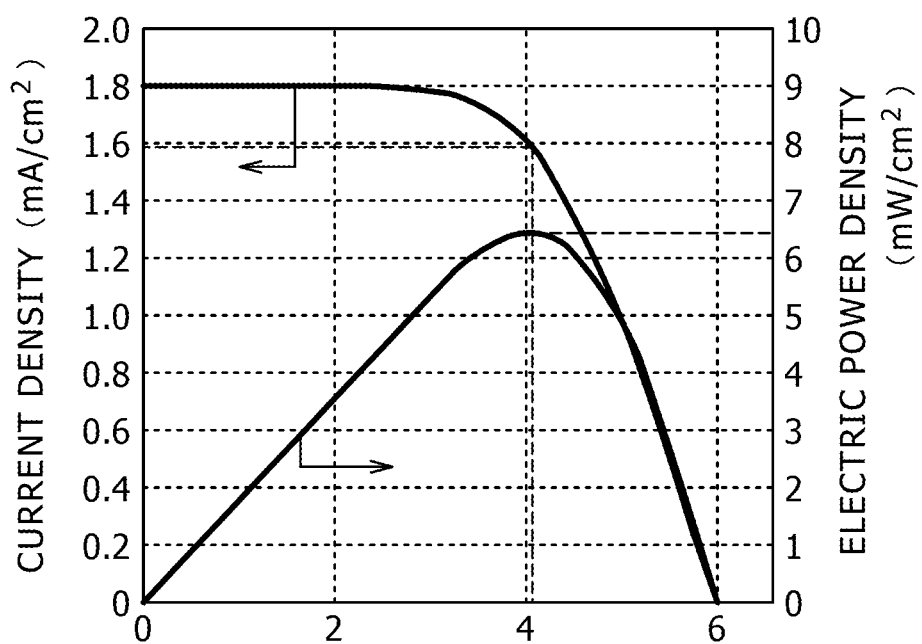
Figure 4:
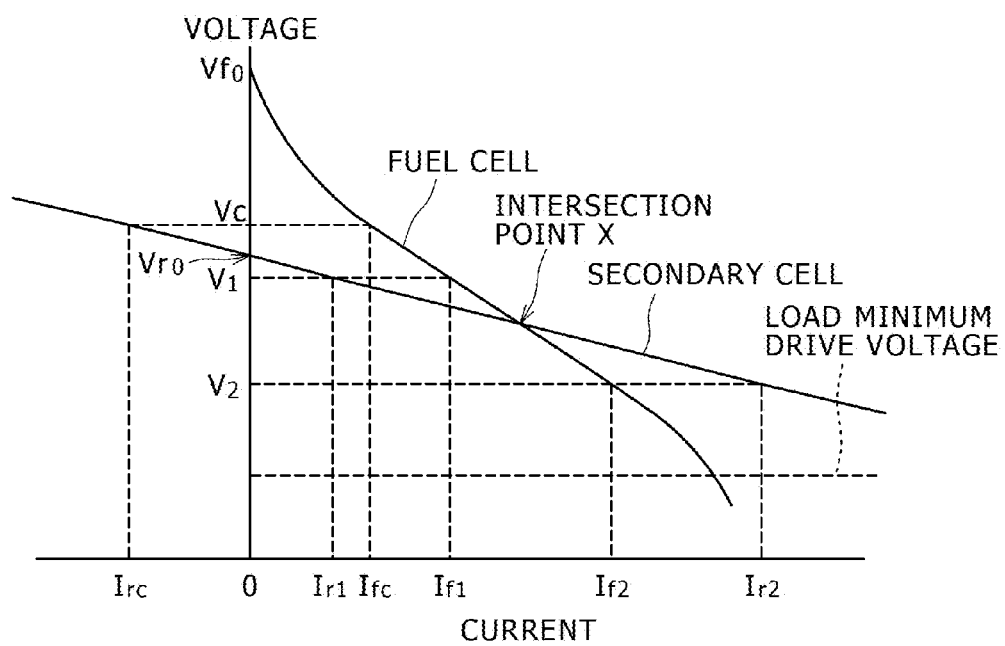
FIG. 4 is a graphical representation for explaining an operation of a power source system proposed in Patent Document 1 based on current-voltage characteristics of a fuel cell and a secondary cell.
Figure 5:
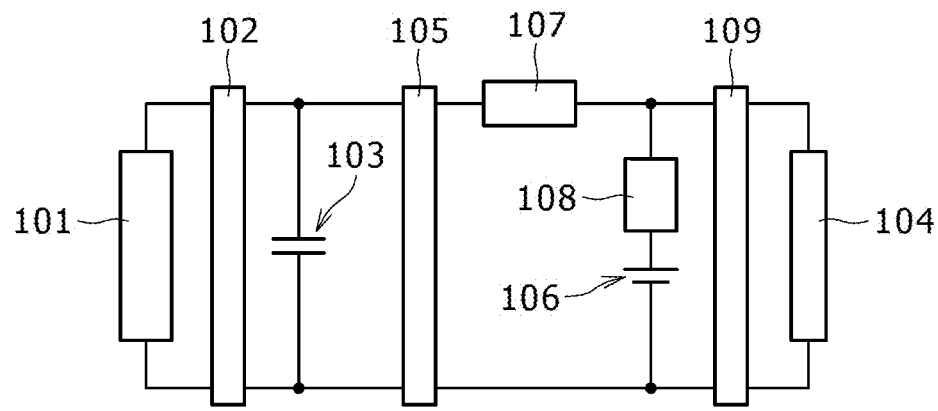
FIG. 5 is schematic diagrams showing configurations of a portable power source apparatus 100(a) with a battery charger, and a current controlling circuit 107(b) proposed in Patent Document 2.
Figure 5:
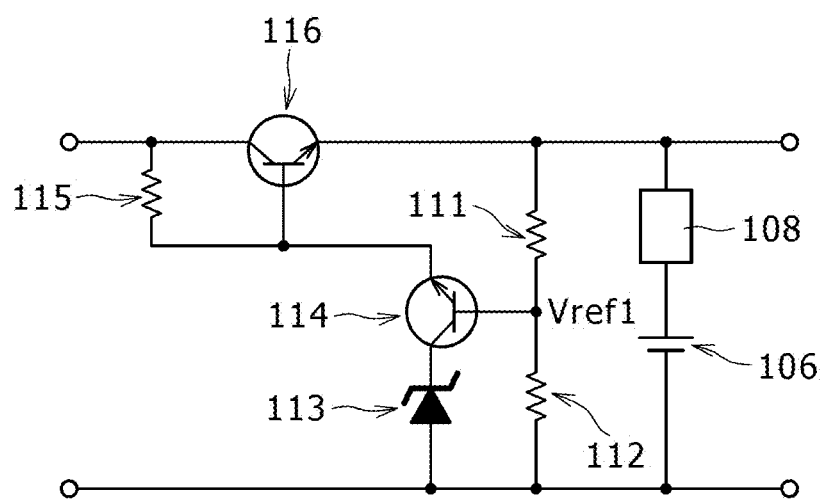

FIG. 3(a) is a schematic diagram showing a configuration of a hybrid power source system 30 based on Embodiment 3 of the present invention. The hybrid power source system 30 is composed of a solar cell module 1, a DC/DC converter 31 as the direct-current voltage converting means described above, a secondary cell 4, division resistors 21 and 22, and a shunt regulator circuit 23. In the hybrid power source system 30, the DC/DC converter 31 is used instead of the DC/DC converter 2 used in each of the hybrid power source systems 10 and 20, and the resistor 5 is omitted. Since portions other than those are the same as those in the hybrid power source system 20, points of difference will be mainly described.

As previously stated, the output voltage from the DC/DC converter 2 is set slightly higher than the voltage of the secondary cell 4. In this case, although some control of the voltage on the input side of the DC/DC converter 2 can be made by a limitation to an output current, or the like, normally, it is impossible to precisely determine that voltage. That is to say, although the output voltage is kept constant by the DC/DC converter 2, the voltage on the input side is indeterminate.

Figure 6:
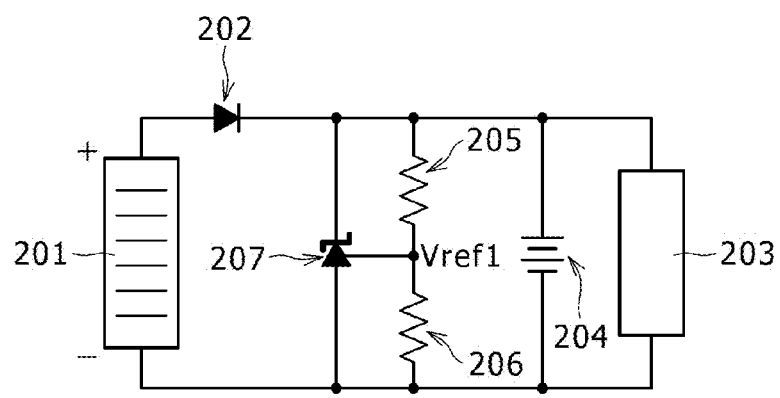
FIG. 6 is schematic diagrams showing a configuration of a power source apparatus using a solar cell proposed in Patent Document 3.
Figure 6:
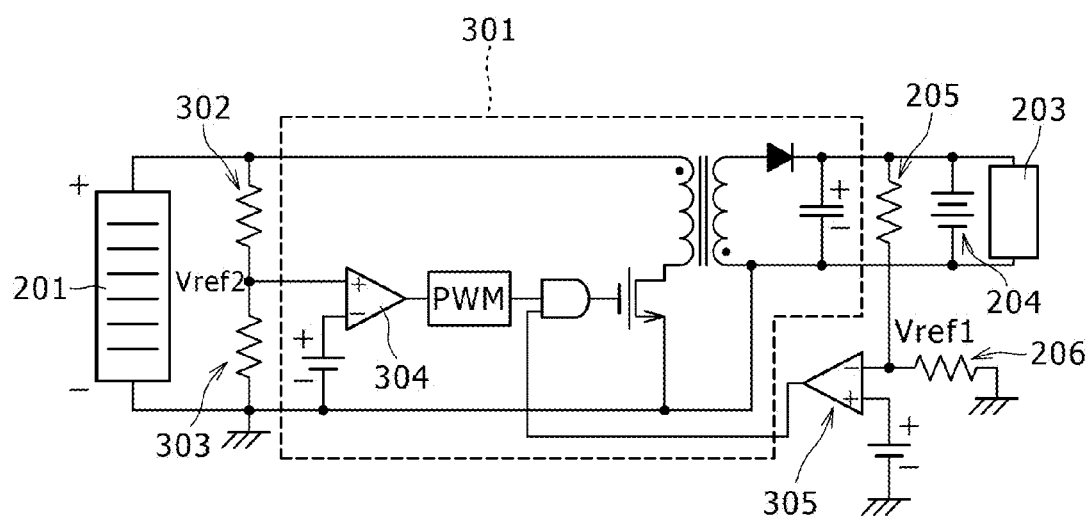

On the other hand, the DC/DC converter 31 used in the hybrid power source system 30 has a function of controlling the voltage on the input side to which the solar cell module 1 is connected, to an optimal operating voltage of the solar cell module 1 or the vicinity thereof. For this reason, the DC/DC converter 31 is configured in such a way that, for example, like the DC/DC converter 301 shown in FIG. 6(b), the division resistors for dividing the output voltage from the solar cell module 1 to give a reference voltage is provided on the input side, the difference between the reference voltage and the built-in standard voltage is amplified by the error amplifier, and the operation of the DC/DC converter is controlled based on the magnitude of the resulting difference, whereby the input side voltage is held at the predetermined magnitude. Specifically, LT3652 (product name; manufactured by Linear Technology Corporation) which is offered commercially as a battery charger IC or the like can be used as the DC/DC converter 31.

Since the output side voltage of the DC/DC converter 31 becomes indeterminate, in the hybrid power source system 30, it is possible to omit the resistor 5 which is provided in each of the hybrid power source systems 10 and 20. In this case, when the secondary cell 4 does not reach the substantial full charging state, and thus the transistor 24 of the shunt regulator circuit 23 is in the OFF state, the output side voltage of the DC/DC converter 31 is automatically adjusted by an open voltage of the secondary cell 4, an internal resistance of the secondary cell 4, and an output impedance of the DC/DC converter 31. On the other hand, when the secondary cell 4 reaches the substantial full charging state, the transistor 24 immediately becomes the ON state, and the output side voltage of the DC/DC converter 31 is held equal to Vmax. Owing to the voltage limiting operation by the shunt regulator circuit 23, the secondary cell 4 is prevented from being overcharged. In addition thereto, since the surplus electric power is shunted through the transistor 24, it is also prevented that the surplus electric power becomes unable to be taken out from the solar cell module 1, which results in that the temperature rise is caused, thereby accelerating the thermal deterioration of the solar cell module 1.

FIG. 3(b) is a graph showing an example of electric power generation characteristics of the solar cell module 1. Since the solar cell does not have a function of storing the energy, it is better that in order to make good use of the irradiated light, the solar cell is caused to continuously generate the electric power on the high output as much as possible for whatever electric power demanded for a load 3. Therefore, in the case of the solar cell module 1 having the electric power generation characteristics shown in FIG. 3(b), it is better that the solar cell module 1 is operated in such a way that the generated voltage usually becomes constant at the level of about 4.1 V. In the hybrid power source system 30, since the input side voltage can be controlled so as to usually become constant at the level of about 4.1 V by the division resistors provided on the input side of the DC/DC converter 31, the light irradiated to the solar cell module 1 can be converted into the electric power at the highest efficiency.

Although the present invention has been described so far based on the embodiments, it goes without saying that the examples described above can be suitably changed without departing from the subject matter of the present invention based on the technical idea of the present invention.

DESCRIPTION OF REFERENCE SYMBOLS

1 . . . Solar cell module, 2 . . . DC/DC converter, 3 . . . Load, 4 . . . Secondary cell, 5 . . . Resistor, 6 . . . Constant voltage diode, 7 . . . Plural diodes connected in series, 10, 11, 20 . . . Hybrid power source system, 21, 22 . . . Division resistor, 23 . . . Shunt regulator circuit, 24 . . . Transistor, 25 . . . Standard voltage generating portion, 26 . . . Error amplifier, 30 . . . Hybrid power source system, 31 . . . DC/DC converter, 100 . . . Portable power source apparatus with battery charger, 101 . . . Solar cell, 102 . . . DC/DC converter (backflow preventing diode), 103 . . . Electric double layer capacitor, 104 . . . Load, 105 . . . DC/DC converter, 106 . . . Secondary cell, 107 . . . Current controlling circuit, 108 . . . Overcurrent preventing circuit, 109 . . . DC/DC converter, 111, 112 . . . Division resistor, 113 . . . Constant voltage diode, 114 . . . Control resistor 115 . . . Load resistor, 116 . . . Power transistor, 200 . . . Power source apparatus, 201 . . . Solar cell module, 202 . . . Backflow preventing diode, 203 . . . Load, 204 . . . Secondary cell, 205, 206 . . . Division resistor, 207 . . . Shunt regulator, 300 . . . Power source apparatus, 301 . . . DC/DC converter, 302, 303 . . . Division resistor, 304 . . . Error amplifier, 305 . . . Comparator, A . . . Anode terminal of shunt regulator circuit 23, K . . . Cathode terminal of shunt regulator circuit 23, REF . . . Reference voltage terminal of shunt regulator circuit 23, Vref1, Vref2 . . . Reference voltage, X . . . Intersection point

The invention claimed is:

1. A hybrid power source system comprising:
a solar cell module or a fuel cell module;
direct-current to direct-current (DC/DC) voltage converter configured to supply a voltage to a load and a secondary cell after said solar cell module or said fuel cell module is connected to an input side of the DC/DC voltage converter, said load and said secondary cell being connected to an output side of the DC/DC voltage converter, wherein a generated electric power which said solar cell module or said fuel cell module generates is converted into the voltage, and
wherein said secondary cell is connected in parallel with said load;
division resistors configured to divide a voltage developed across said secondary cell to generate a reference voltage; and
a shunt circuit connected in parallel with said secondary cell on the output side of said DC/DC voltage converter, wherein said shunt circuit is configured to generate a voltage having a magnitude which enables the secondary cell to be substantially in a full charging state, and wherein said magnitude is such that an overcharging of said secondary cell is prevented, wherein said shunt circuit comprises:
a standard voltage generating portion configured to generate a standard voltage,
wherein operation of said DC/DC voltage converter is controlled based on a difference between said reference voltage and said standard voltage, and
wherein a voltage at which said secondary cell becomes substantially fully charged is determined from the following:

$V\max=(R+1)Vs,$ wherein Vmax is said voltage at which said secondary cell becomes substantially fully charged, R is a ratio of resistance values of said division resistors, and Vs is said standard voltage.

2. The hybrid power source system according to claim 1, wherein an output voltage from said DC/DC voltage converter is set slightly higher than a voltage of said secondary cell.

3. The hybrid power source system according to claim 1, wherein an input voltage of said DC/DC voltage converter is controlled so as to become an optimal operating voltage of said solar cell module or said fuel cell module, or the vicinity thereof.

4. The hybrid power source system according to claim 1, wherein said shunt circuit is composed of a constant voltage diode having a Zener voltage, wherein a magnitude of said Zener voltage is such that said secondary cell is charged to a substantially full charging state, and wherein said magnitude is such that an overcharging of said secondary cell is prevented.

5. The hybrid power source system according to claim 1, wherein said shunt circuit is composed of plural diodes connected in series, and a sum of forward voltage drops of said diodes is a voltage having a magnitude which enables said secondary cell to be substantially in a full charging state, and wherein said magnitude is such that an overcharging of said secondary cell is prevented.

6. The hybrid power source system according to claim 1, wherein said shunt circuit is composed of a shunt regulator circuit having a shunt path composed of a transistor, and a maximum value of a voltage applied across terminals of said secondary cell is controlled by said shunt regulator circuit so as to become a voltage having a magnitude which enables said secondary cell to be substantially in a fully charged state, and wherein said magnitude is such that an overcharging of said secondary cell is prevented.

7. The hybrid power source system according to claim 6, wherein the maximum value of the voltage controlled by said shunt regulator circuit is set by comparison between said reference voltage and said standard voltage.

8. The hybrid power source system according to claim 1, wherein said solar cell is a dye-sensitized solar cell.

9. The hybrid power source system according to claim 1, wherein said fuel cell is a direct methanol fuel cell.

10. The hybrid power source system according to claim 1, wherein said secondary cell is a lithium-ion cell.

* * * * *